Patented Sept. 23, 1952

2,611,781

UNITED STATES PATENT OFFICE 2,611,781

TRIORGANOSILYLPHENOXYSILANES

John L. Speier, Jr., Pittsburgh, Pa., assignor to Dow Corning Corporation, Midland, Mich., a corporation of Michigan No Drawing. Application September 18, 1950, Serial No. 185,516. In Great Britain November 29, 1949

14 Claims. (Cl. 260—448.8)

This invention relates to triorganosilylphenoxysilanes.

In the applicant's copending application filed concurrently herewith, the trialkylsilylphenoxysilanes were disclosed and claimed. This invention relates to similar compounds in which one or more of the silicon atoms has an alkoxy group attached thereto.

The compounds of this invention are useful as intermediates in the preparation of organosilylphenols and may be employed as heat exchange media and thermo expansion fluids.

This invention relates to compounds of the type

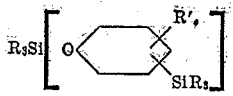

in which R is an alkyl radical such as methyl, propyl and octadecyl, or alkoxy radical, there being at least 2 alkyl radicals attached to each silicon atom anad an alkoxy radical attached to at least one of the silicon atoms, R' is alkyl such as, for example, methyl, amyl, octadecyl and cyclohexyl, or phenyl, and $c$ has a value from 0 to 1.

The above compounds are prepared by reacting a halophenoxysilane of the type

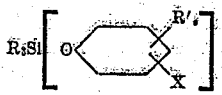

a silane of the type $R_aSiY_{4-a}$ and an alkali metal. In the silane R is an alkyl radical such as methyl, ethyl and octadecyl, Y is a halogen atom or alkoxy radical there being less than 2 halogen atoms per silicon atom, and $a$ has a value from 2 to 3. In the phenoxysilane X is a halogen atom and R is an alkyl or alkoxy radical.

The method for carrying out the process is that of adding a mixture of the reactants to a molten alkali metal. Preferably the alkali metal is sodium or potassium.

If desired, an inert solvent, boiling above the melting point of the alkali metal may be employed. Such solvents include, for example, benzene, toluene, saturated aliphatic hydrocarbons boiling above 65° C. and higher boiling ethers. In carrying out the reaction, care should be taken that the reaction medium is essentially free of active hydrogen compounds such as alcohols, water and acids.

The products of this invention are obtained when the following classes of phenoxysilanes and chloro or alkoxysilanes are reacted:

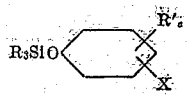

with $R_2Si(OR)_2$ or $R_2Si(OR)Cl$; and

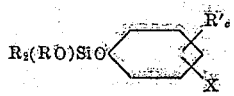

with $R_2Si(OR)Cl$ or $R_3SiCl$. In these formulae R represents an alkyl radical.

The reaction of halophenoxysilanes, chlorosilanes or alkoxysilanes and an alkali metal is a complex phenomena. Not only are the normal reaction products which would be expected from a simple condensation reaction produced, but also rearrangement products.

The rearrangement products which occur when the above reactions are carried out in the presence of an alkali metal are illustrated by the following example. When a compound of the type

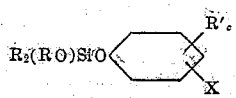

is condensed with a compound of the type

one would normally expect that the predominant product would be

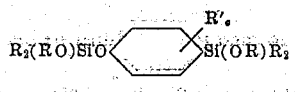

However, in addition to the expected product, compounds of the following type are also obtained:

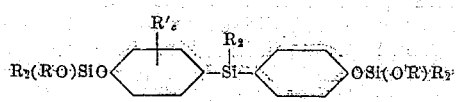

together with complex polymeric materials containing the following units:

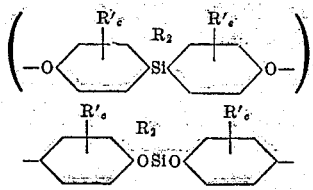

and

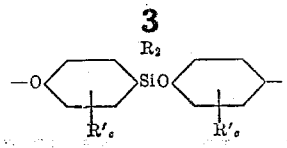

The halophenoxysilanes employed in this invention may be prepared by condensing halophenols of the type

with silanes of the type $R''_3SiY$ where $R''$ is alkyl or alkoxy there being at least two alkyls per silicon and Y is chlorine or alkoxy. The products are produced by mixing the phenol and silane whereupon condensation between the phenolic hydroxyl and the silane Y group takes place with the elimination of HCl or an alcohol. The reaction will proceed at room temperature although with orthohalophenols or with silanes containing no chlorine it is best to heat the mixture in order to speed the reaction. After reaction is complete the halophenoxysilane may be purified by distillation.

The organosilanes of the type $R''_3SiY$ are well known commercially available materials.

The following examples are illustrative only. In the examples, Me designates a methyl radical and Et an ethyl radical.

EXAMPLE 1

106 g. of p-chlorophenoxyethoxydimethylsilane was mixed with 76 g. of ethoxydimethylchlorosilane and reacted with 23 g. of molten sodium in boiling toluene. The mixture was filtered and distilled and there was obtained 45 g. of $EtOMe_2Si(p-[EtOMe_2Si]C_6H_4O—)$, boiling point 168° C. at 25 mm. In addition there was obtained a nondistillable material which was a complex mixture of rearrangement products and polymeric materials having the following structural units:

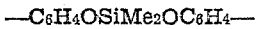

and

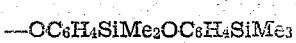

EXAMPLE 2

A mixture of 148 g. of dimethyldiethoxysilane and 200.5 g. of p-chlorophenoxytrimethylsilane was added to 50.6 g. of sodium in boiling toluene. The reaction proceeded smoothly and continued until the addition was complete. Sodium ethoxide formed by the reaction caused the mixture to be extremely viscous and gelatinous. Trimethylchlorosilane was added to react with this sodium ethoxide and did so smoothly causing the mixture to become fluid again. The mixture was then filtered and distilled. The following products were obtained: A mixture of $Me_3Si(p-EtOMe_2SiC_6H_4O—)$ and $EtOMe_2Si(p-Me_3SiC_6H_4O—)$, boiling point 152° C. at 25 mm., $EtOMe_2Si(p-EtOMe_2SiC_6H_4O—)$ boiling point 163° C. at 25 mm., together with the unexpected rearrangement product $Me_3Si(p-Me_3SiOC_6H_4O—)$ boiling point 132° C. at 25 mm.

In addition a complex high boiling residue containing polymers of the type shown in Example 1 was also obtained.

EXAMPLE 3

When a mixture of 214.5 g. of 3-methyl-4-chlorophenoxytrimethylsilane and 152 g. of ethoxydimethylchlorosilane is reacted with 50 g. of molten sodium by the procedure of Example 1, there is obtained 3-methyl-4-ethoxydimethylsilylphenoxytrimethylsilane, $Me_3Si[3-Me-4-(EtOMe_2Si)C_6H_3O—]$

EXAMPLE 4

When a mixture of 276.5 g. of 2-phenyl-4-chlorophenoxytrimethylsilane and 152 g. of ethoxydimethylchlorosilane is reacted with 50 g. of molten sodium by the procedure of Example 1, there is obtained as a product the compound $Me_3Si[2-C_6H_5-4-(EtOMe_2Si)C_6H_3O—]$, 2-phenyl-4-ethoxydimethylsilylphenoxysilane.

That which is claimed is:

1. Compounds of the formula

in which R is a radical selected from the group consisting of alkyl and alkoxy radicals, there being at least 2 alkyl radicals attached to each silicon atom and an alkoxy radical attached to at least one of the silicon atoms, R' is a radical selected from the group consisting of alkyl and phenyl radicals, and c is an integer from 0 to 1 inclusive.

2. $C_2H_5O(CH_3)_2Si[C_2H_5O(CH_3)_2SiC_6H_4O—]$.
3. $(CH_3)_3Si[C_2H_5O(CH_3)_2SiC_6H_4O—]$.
4. $C_2H_5O(CH_3)_2Si[(CH_3)_3SiC_6H_4O—]$.
5. The method which comprises reacting a halophenoxysilane of the formula

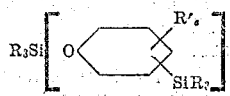

in which R is a radical selected from the group consisting of alkyl and alkoxy radicals at least two of the radicals being alkyl, R' is a radical selected from the group consisting of alkyl and phenyl radicals, c is an integer from 0 to 1 inclusive, and X is a halogen atom, with an alkylsilane of the formula $R_aSiY_{4-a}$, in which R is an alkyl radical, Y is a substituent selected from the group consisting of halogen atoms and alkoxy radicals there being less than 2 halogen atoms per silicon atom, and a is an integer from 2 to 3 inclusive, by contacting the two with an alkali metal, whereby a compound of the formula

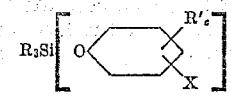

is formed.

6. The method in accord with claim 5 wherein the halophenoxy silane is chlorophenoxyethoxydimethylsilane.

7. The method in accord with claim 5 wherein the halophenoxysilane is chlorophenoxytrimethylsilane.

8. The method in accord with claim 5 wherein the alkylsilane is dimethyldiethoxysilane.

9. The method in accord with claim 5 wherein the alkylsilane is ethoxydimethylchlorosilane.

10. The method which comprises reacting a halophenoxysilane of the formula

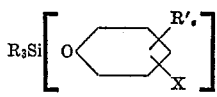

in which R is a radical selected from the group consisting of alkyl and alkoxy radicals at least two of the radicals being alkyl, R' is a radical selected from the group consisting of alkyl and phenyl radicals, $c$ is an integer from 0 to 1 inclusive, and X is a halogen atom, with an alkylsilane of the formula $R_aSiY_{4-a}$, in which R is an alkyl radical, Y is a substituent selected from the group consisting of halogen atoms and alkoxy radicals, there being less than two halogen atoms per silicon atom, and $a$ is an integer from 2 to 3 inclusive, by contacting the two in liquid phase with a molten alkali metal, whereby a compound of the formula

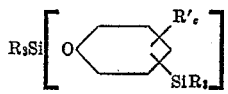

is formed.

11. The method in accordance with claim 10 wherein the halophenoxysilane is chlorophenoxyethoxydimethylsilane.

12. The method in accordance with claim 10 wherein the halophenoxysilane is chlorophenoxytrimethylsilane.

13. The method in accordance with claim 10 wherein the alkylsilane is dimethyldiethoxysilane.

14. The method in accordance with claim 10 wherein the alkylsilane is ethoxydimethylchlorosilane.

JOHN L. SPEIER, Jr.

No references cited.